Dec. 15, 1925.　　　　　　　　　　　　　　　　1,566,089
E. HARDING
DEVICE FOR PULLING OUT BATTERIES
Filed May 2, 1925　　　3 Sheets-Sheet 1

Witness:
Chas. R. Trush.

Inventor,
EDWARD HARDING
By George Bayard Jones

Dec. 15, 1925.                                              1,566,089
                          E. HARDING
                  DEVICE FOR PULLING OUT BATTERIES
                  Filed May 2, 1925        3 Sheets-Sheet 2
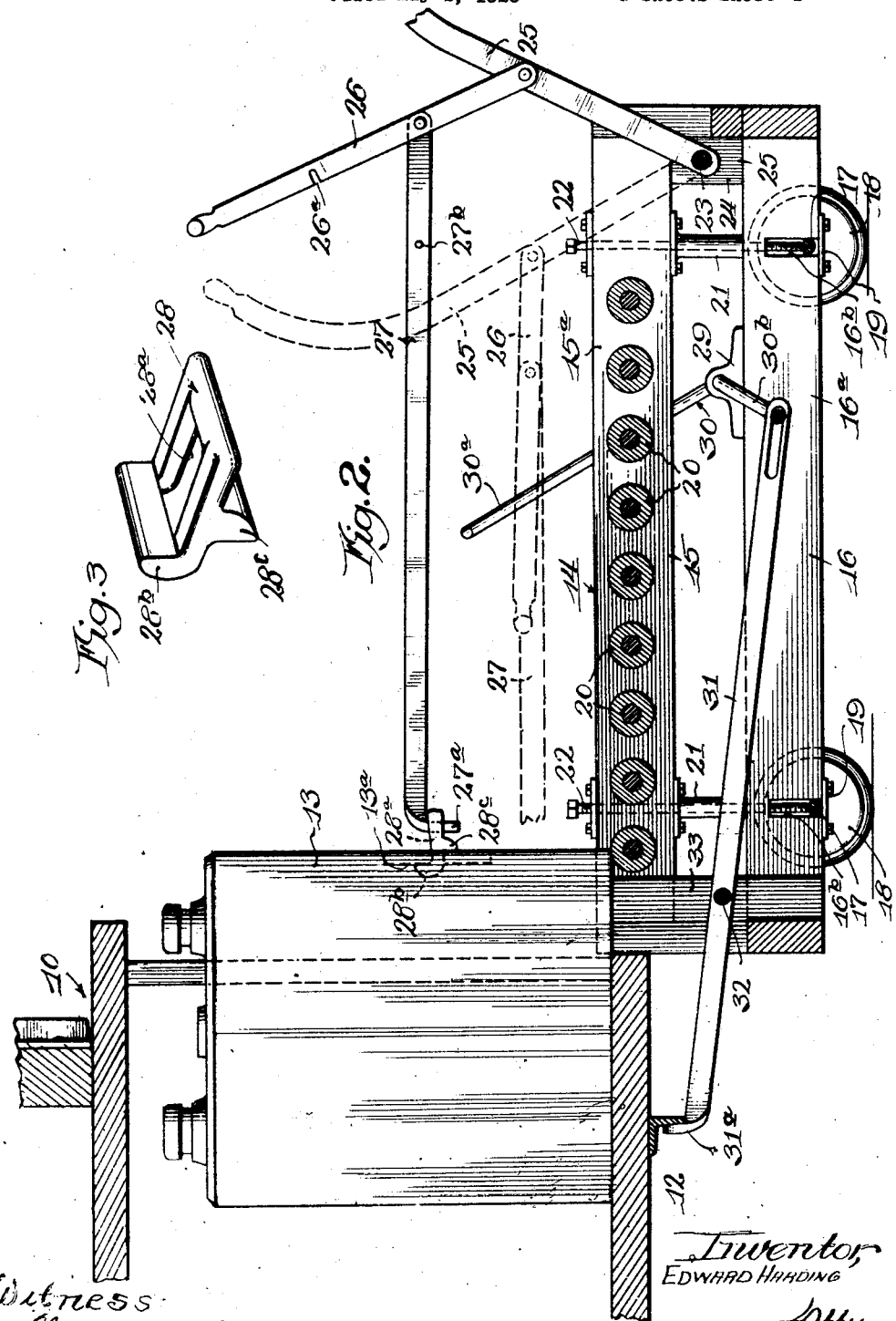
Inventor,
EDWARD HARDING

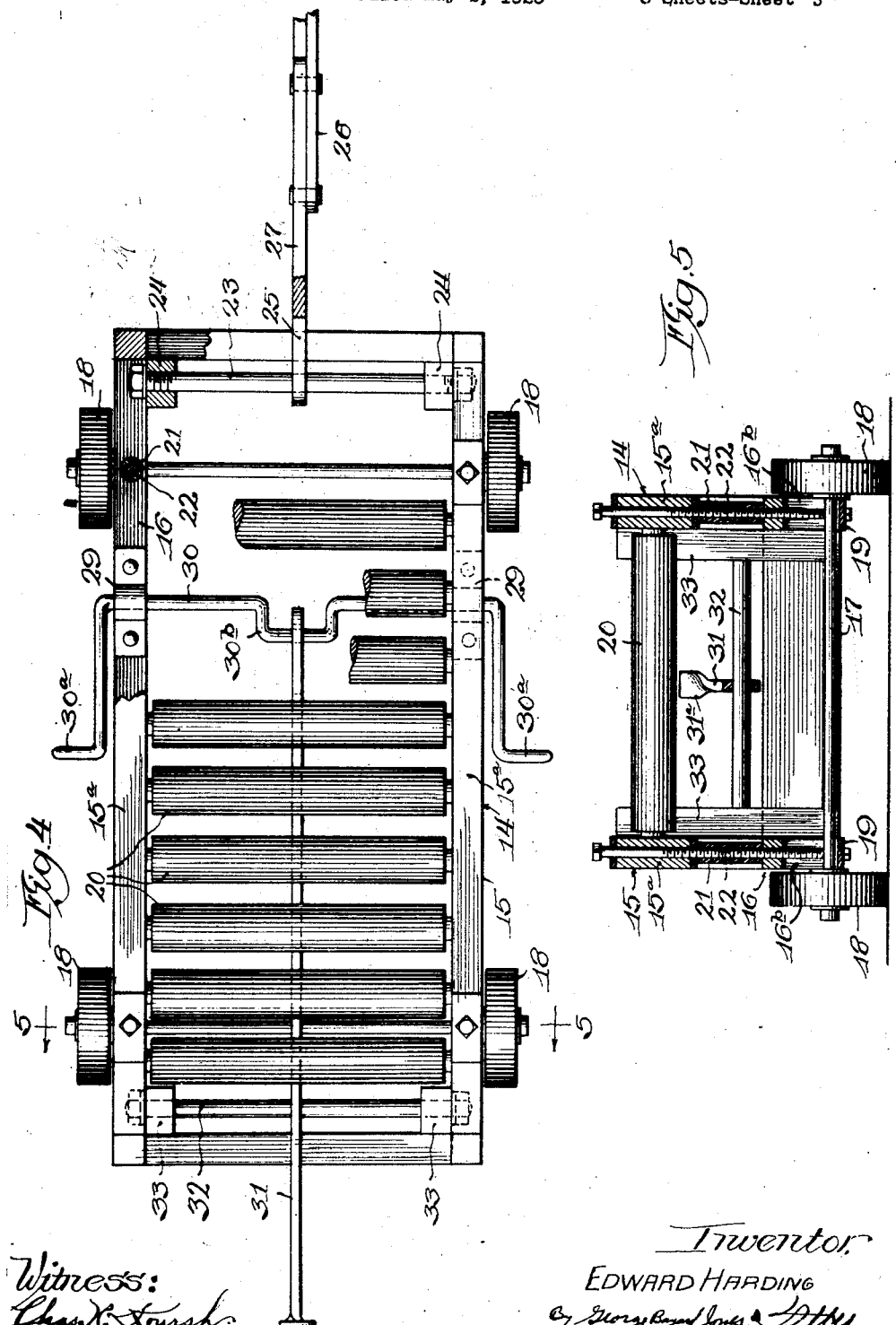

Patented Dec. 15, 1925.

1,566,089

UNITED STATES PATENT OFFICE.

EDWARD HARDING, OF CHICAGO, ILLINOIS.

DEVICE FOR PULLING OUT BATTERIES.

Application filed May 2, 1925. Serial No. 27,447.

*To all whom it may concern:*

Be it known that I, EDWARD HARDING, a citizen of the United States, residing at Chicago, in the county of Cook and State of Illinois, have invented certain new and useful Improvements in Devices for Pulling Out Batteries, of which the following is a specification.

This invention relates to battery pulling apparatus, or the like.

The batteries of electrically propelled vehicles, especially of trucks, in use at the present time, often weigh as much as four hundred pounds, or more, and since they must be removed quite frequently for recharging, adding water or repairing, the handling of the same has presented heretofore a very difficult problem. In service stations where many patrons are served, it has been difficult to obtain men of the physical strength required for removing and replacing the batteries, since each truck is equipped with several batteries, which are carried on a platform supported from the frame or chassis of the vehicle between the front and rear wheels thereof, and thus not easily accessible. In addition to the weight of the batteries, the same are often found adhering to the platform, thus increasing the difficulty in initially moving the same.

The principal object of the invention therefore is to provide apparatus whereby the batteries may be pulled or removed from, or placed in the vehicle easily and expeditiously.

Another object is to provide wheeled apparatus for carrying the batteries to and from the vehicles, and having means for adjusting the same to vehicles of different makes which carry the batteries at different heights from the ground.

Further objects relate to various features of construction and arrangement which will be apparent from a consideration of the following specification and accompanying drawings, wherein Fig. 1 is a side elevation of my apparatus showing the same about to be moved into operative position with reference to a vehicle shown in cross-section.

Fig. 2 is a sectional elevation of the apparatus illustrating the use of the same.

Fig. 3 is a detail view of a hook used in handling batteries of certain construction.

Fig. 4 is a plan view of my apparatus, and

Fig. 5 is a vertical sectional view taken on line 5—5 Fig. 4.

Figure 1:
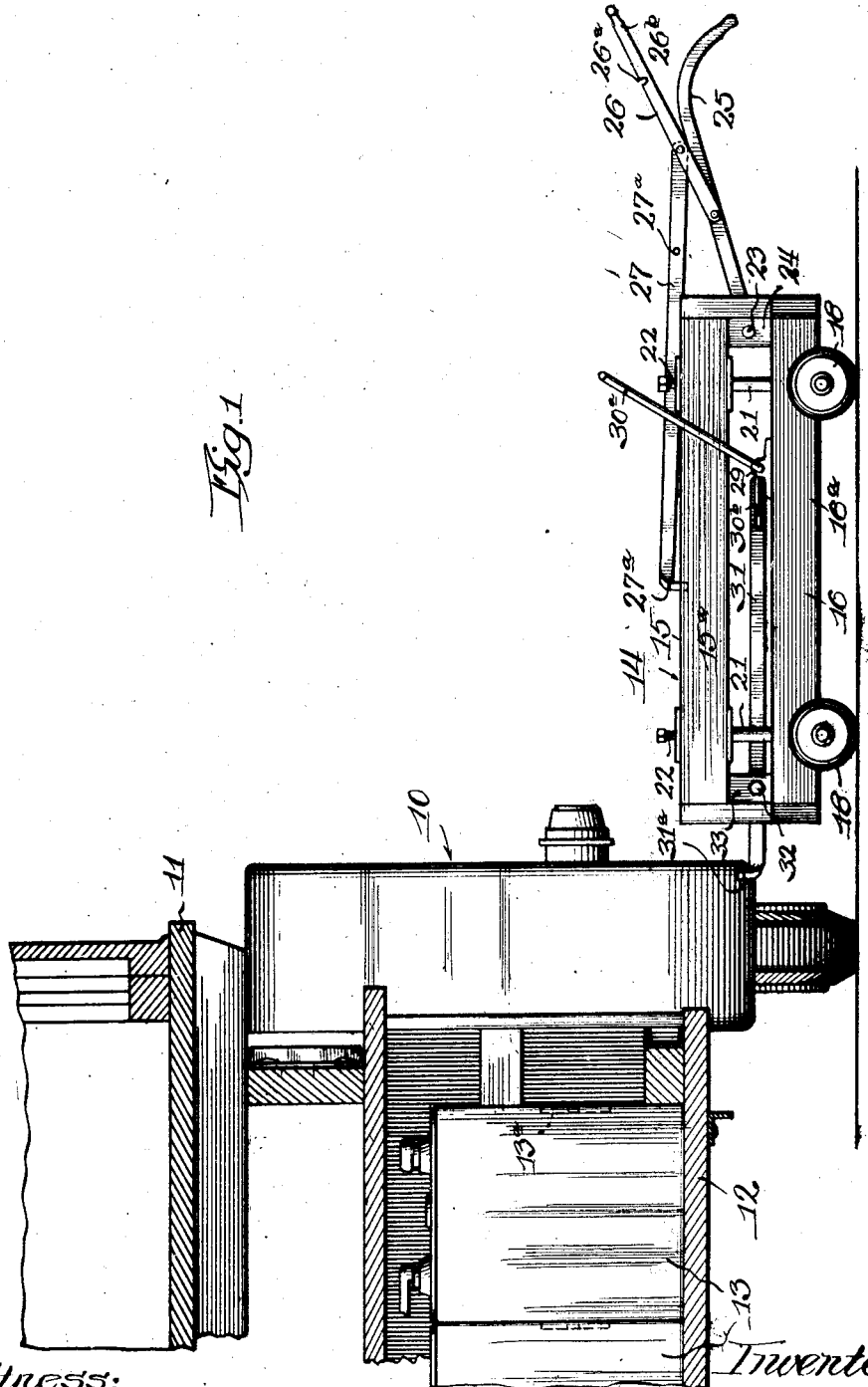

The same reference characters are used to indicate like elements in all the views, wherein 10 indicates, generally, an electrically propelled vehicle having the usual load carrying platform 11, beneath which and between the front and rear wheels is provided the battery supporting platform 12. The platform 12 is supported from the frame or other portion of the chassis in any approved manner and need not be specifically described. Batteries 13, which supply power to the vehicle, are carried on platform 12, and may be removed from the same laterally of the vehicle.

The apparatus for handling the batteries comprises a body or frame indicated, generally by numeral 14, said body having upper and lower rectangular frame sections 15 and 16, respectively. The side members 16$^a$ of the lower frame section are provided with slots 16$^b$, as shown in Fig. 4, within which the axles 17 of wheels 18 are received. The base of the slots may be closed by plates 19 to limit the upward movement of the body 14 and to confine the axles therein. The upper frame section 15 is provided with a plurality of horizontally alined rollers 20 journaled in the side members 15$^a$, as shown in Figs. 2, 4 and 5. The upper and lower frame sections 15 and 16 are spaced vertically by threaded sleeves 21 which may be bolted to the upper side members 15$^a$, as shown clearly in Fig. 2. Threaded bolts 22 pass through the side members 15$^a$, sleeves 21 and into the slots 16$^b$ and contact with the upper surface of the axles 17. The upper ends of the bolts 22 are squared, as shown, or otherwise shaped, whereby the same may be conveniently actuated by a wrench or other tool, thereby adjusting the frame 14, as desired, in order that the tops of the rollers 20 may be brought in horizontal alinement with the platform 12 which carries the batteries 13, or at least in such relation that the top of the roller nearest the platform is in the same plane as said platform as clearly shown in Fig. 2.

A rod 23 extends transversely of the frame adjacent the front thereof, and is anchored at the ends in suitable blocks 24, for instance, which may be suitably secured to the frame. The rod 23 forms a pivot for the operating lever 25 to which an auxiliary lever 26 is pivoted, as shown in Figs. 1 and 2. An arm or bar 27 is pivoted to auxiliary lever 26 and has its free end formed as a hook 27$^a$ which is adapted to pass into aperture 28$^a$ of a removable hook 28 which is insertable in a socket 13$^a$ in the side of the battery 13. The hook 28 can readily be removed from the socket 13$^a$ when the battery is in position on the platform 12 in order that the batteries may be placed closely together. The hook 28 is provided with a pair of lugs 28$^b$ and 28$^c$, as shown in Fig. 3, which prevent the same from being withdrawn except by tilting the same upwardly, as will be obvious. Other types of batteries are provided with different means for engaging the same, such as handles, or the like, and it will be understood that the form herein described is for the purpose of illustration only.

Secured to the lower frame section 16 of the apparatus is a pair of blocks 29 through which pass the bell-crank lever 30, having a pair of operating handles 30$^a$, shown clearly in Fig. 4. A locking lever 31 is pivoted adjacent the rear end of the frame or body 14 by means of a rod 32 which is supported by blocks 33, or the like. The rear end of the lever 31 is slotted, as shown, for the reception of the crank 30$^b$ of the bell-crank lever 30, while the forward end is formed as an upturned hook 31$^a$ adapted to engage any portion of the vehicle chassis, as shown in Fig. 2, for preventing the apparatus from moving away from the vehicle when the batteries are being placed in position on the platform 12.

In operation, assuming that the batteries are to be removed from the vehicle, the apparatus is moved to the position shown in Fig. 2, and the body or frame 14 is adjusted vertically to bring the rollers 20 at the proper height with reference to the platform 12. Lever 25 is then moved to the left, as shown in Fig. 2, until the hook 27$^a$ of lever 27 is in position to be engaged with the removable hook 28, previously inserted in socket 13$^a$ of a battery 13. It will be seen that lever 26 acts as a link between lever 25 and lever 27 whereby the latter is given a longer reach for engagement with batteries removed somewhat from the near edge of the platform 12. This position of the levers is indicated in dotted lines in Fig. 2. After the hook 27$^a$ has engaged the removable hook 28 the lever 25 is moved to the right, as shown in Fig. 2, drawing the battery upon the rollers 20, as will be clear. In case the throw of the lever 25 to the right is not sufficient to carry the battery to the rollers 20, the auxiliary lever 26 is moved to the right on its pivot until said lever coincides with the lever 25. The operator may then operate both levers 25 and 26 as a single lever, thus pulling the battery upon the rollers 20. In this way a lever having a variable throw, or variable arm ratio, is provided, and the removal of batteries from the center or far side of the platform, as well as those at the near side can be accomplished expeditiously.

In replacing batteries, the apparatus is wheeled to the side of the vehicle and the battery moved on the rollers 20 by hand to the edge of the platform. Further movement of the batteries may be effected by means of the levers 25 and 26, as will be obvious. In placing the batteries on platform 12, the tendency of the apparatus will be to move away from the vehicle when the levers 25 and 26 are moved to the left. To hold the apparatus in position during this operation, the previously described locking arrangement comprising the bell-crank lever 30 and pivoted lever 31 have been provided. It will be seen that when the apparatus is locked, as shown in Fig. 2, that the same will be held in position during the replacing of the batteries upon the platform 12.

To insure that the lever 26 and arm 27 will act as a rigid unit in replacing the batteries, as above described, a slot 26$^a$ is provided in lever 26 for receiving a pin 27$^a$ secured in arm 27. It will be seen that the slot and pin will serve to lock the lever 26 and arm 27 together to prevent relative movement of said members on the pivot connecting the same during the loading operation. The free end of lever 26 is bent outwardly, as shown at 26$^b$, to provide a convenient handle for the operator in moving the lever from the last described positions to the positions shown in Figs. 1 and 4, for instance.

Although I have shown certain features of my invention for the purpose of illustration, it will be seen that changes may be made therein without departing from the spirit thereof, and I do not wish to be restricted to the specific modification herein shown and described, except where limited thereto by the following claims.

What I claim as new is:

1. Apparatus of the class described comprising a body, rollers carried thereby, said body being provided with slots in the lower portion thereof, wheels upon which said apparatus is mounted, said wheels having axles passing into said slots, and means coacting with said axles for adjusting said body with reference to said axles.

2. Apparatus of the class described comprising a vertically adjustable body, rollers thereon, and pivoted means for moving articles substantially horizontally onto and off said rollers.

3. Apparatus of the class described comprising a vertically adjustable body, rollers thereon, and means for moving articles onto and off said rollers, said means comprising a lever.

4. Apparatus of the class described comprising a vertically adjustable body, rollers thereon, and means for moving articles onto and off said rollers, said means comprising a lever pivoted to said body.

5. Apparatus of the class described comprising a vertically adjustable body, rollers thereon, and means for moving articles onto and off said rollers, said means comprising a lever and an arm pivotally secured thereto.

6. The combination with a battery supporting platform, of a movable body having means for adjusting it vertically at a plurality of points whereby the plane of its upper surface may be varied to bring the side nearest said platform into the same plane as said platform, and means for moving batteries from said platform onto said surface, and vice versa.

7. The combination with a battery supporting platform, of a movable body adapted to be adjusted into horizontal alinement with said platform, rollers on said body, and means for moving batteries from said platform onto said rollers, and vice versa, said means comprising a lever and an arm actuated thereby.

8. The combination with a battery supporting platform, of a movable body adapted to be adjusted into horizontal alinement with said platform, rollers on said body, and means for moving batteries from said platform onto said rollers, and vice versa, said means comprising a lever and an arm actuated thereby, said arm having battery engaging means.

9. The combination with a battery supporting platform, of a movable body adapted to be adjusted into horizontal alinement with said platform, rollers on said body, and means for moving batteries from said platform onto said rollers, and vice versa, said means comprising a lever, an arm actuable thereby, and a link interposed between said lever and arm and serving as an extension of the latter when desired.

10. The combination with a battery supporting platform, of a movable body adapted to be adjusted into horizontal alinement therewith, means carried by said body for moving batteries from said platform to said body and vice versa, and a locking mechanism secured to said body for holding the latter stationary during the moving of said batteries.

11. The combination with a battery supporting platform, of a movable body adapted to be adjusted into horizontal alinement therewith, means carried by said body for moving batteries from said platform to said body and vice versa, and a locking mechanism secured to said body for holding the latter stationary during the moving of said batteries, said mechanism comprising a hook and a lever for actuating the same to and from locking position.

12. Apparatus of the class described comprising a movable body, a lever pivoted thereto, an arm having battery engaging means, and an auxiliary lever pivoted to both said arm and first mentioned lever, said auxiliary lever serving as an extension for said arm when desired.

13. Apparatus of the class described comprising a battery supporting body, and means for moving batteries onto and off said body, said means comprising a main lever and an auxiliary lever pivoted thereto, said auxiliary lever being adapted to vary the ratio of the arms of said main lever when desired.

14. Means for withdrawing batteries from a truck, comprising a portable platform for receiving said batteries, a lever pivoted to said platform, a second lever pivoted to said first lever, and a link pivoted to said second lever and having means for engaging a battery whereby said second lever may constitute an extension of said link when said first lever is swung about its pivot to give the battery its initial withdrawal movement, and whereby said second lever may thereafter be used as such, to complete the withdrawal of said battery.

15. Means for withdrawing batteries from and installing them in a truck, comprising a portable platform for receiving said batteries, a lever pivoted to said platform, a second lever pivoted to said first lever, and a link pivoted to said second lever and having means for engaging a battery whereby said second lever may constitute an extension of said link when said first lever is swung about its pivot to give the battery its initial withdrawal movement, and whereby said second lever may thereafter be used as such, to complete the withdrawal of said battery, the reverse operations serving to push a battery from said platform onto said truck.

16. In combination, a battery supporting platform, a body member, independently operable means for adjusting said body with reference to said platform, and pivoted means for moving batteries from said platform to said body, and vice versa.

17. In combination, a battery supporting platform, a movable body member, means for securing said body in operative relation with said platform, and a lever having a battery engaging arm for moving batteries from said platform to said body, and vice versa.

In testimony whereof, I have subscribed my name.

EDWARD HARDING.